US011988796B2

(12) United States Patent
Proctor et al.

(10) Patent No.: US 11,988,796 B2
(45) Date of Patent: May 21, 2024

(54) VISUALIZING FLUID FLOW THROUGH POROUS MEDIA IN VIRTUAL REALITY

(71) Applicant: Halliburton Energy Services, Inc., Houston, TX (US)

(72) Inventors: Jacob Proctor, Houston, TX (US); David d'Angelo, Houston, TX (US); Naum Derzhi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 170 days.

(21) Appl. No.: 17/656,077

(22) Filed: Mar. 23, 2022

(65) Prior Publication Data

US 2022/0308261 A1 Sep. 29, 2022

Related U.S. Application Data

(60) Provisional application No. 63/166,882, filed on Mar. 26, 2021.

(51) Int. Cl.
*G01V 20/00* (2024.01)
*G06T 15/08* (2011.01)
*G06T 19/00* (2011.01)

(52) U.S. Cl.
CPC .............. *G01V 20/00* (2024.01); *G06T 15/08* (2013.01); *G06T 19/00* (2013.01); *G06T 2210/36* (2013.01)

(58) Field of Classification Search
None
See application file for complete search history.

(56) References Cited

U.S. PATENT DOCUMENTS 8,736,600 B2    5/2014   Lin et al.
8,922,636 B1 *  12/2014  Belden .................... G01P 5/001
                                                    348/77

(Continued)

OTHER PUBLICATIONS

Wetzel, Maria, Thomas Kempka, and Michael Kühn. 2020. "Hydraulic and Mechanical Impacts of Pore Space Alterations within a Sandstone Quantified by a Flow Velocity-Dependent Precipitation Approach" Materials 13, No. 14: 3100. https://doi.org/10.3390/ma13143100 (Year: 2020).*

(Continued)

*Primary Examiner* — David H Chu
(74) *Attorney, Agent, or Firm* — John W. Wustenberg; C. Tumey Law Group, PLLC

(57) ABSTRACT

Systems and methods for visualizing fluid flows in a virtual reality (VR) environment are disclosed. A digital volume image representing a reservoir formation sample is obtained from an imaging device. The digital volume is segmented by assigning hydraulic properties of the formation sample to each volume element based on image properties associated with that volume element. Fluid flow is simulated using the segmented digital volume. A vector field representing flow properties at different points along one or more flow lines through the pore space is generated. An interactive visualization of a three-dimensional (3D) virtual environment representing the formation sample with the flow line(s) is provided via a VR display. Responsive to receiving user input specifying an area of the environment to view at a selected level of detail, the specified area is rendered at the selected level of detail and a current view of the interactive visualization is updated accordingly.

20 Claims, 8 Drawing Sheets

(56) References Cited

U.S. PATENT DOCUMENTS

| | | | |
|---|---|---|---|
| 9,171,391 B2 | 10/2015 | Smith | |
| 10,571,603 B2* | 2/2020 | Mookanahallipatna Ramasesha | E21B 43/00 |
| 11,353,621 B2* | 6/2022 | Khan | G08B 5/22 |
| 11,612,516 B2* | 3/2023 | Puglisi | A61B 3/0058 351/205 |
| 2008/0033656 A1* | 2/2008 | Herwanger | G01V 1/30 702/18 |
| 2012/0150518 A1 | 6/2012 | Güyagüler et al. | |
| 2012/0158380 A1* | 6/2012 | Hajibeygi | G06F 17/11 703/2 |
| 2012/0221306 A1* | 8/2012 | Hurley | G01V 99/005 703/6 |
| 2013/0035913 A1* | 2/2013 | Mishev | G06F 30/23 703/2 |
| 2013/0204588 A1 | 8/2013 | Copeland | |
| 2013/0275106 A1 | 10/2013 | Li et al. | |
| 2014/0044315 A1* | 2/2014 | Derzhi | G06T 15/08 382/109 |
| 2014/0343858 A1* | 11/2014 | Crouse | G01V 99/00 702/13 |
| 2018/0252076 A1* | 9/2018 | Bryant | E21B 43/16 |
| 2019/0186255 A1* | 6/2019 | Mustapha | G06F 17/16 |
| 2019/0331832 A1* | 10/2019 | Chandra | G01W 1/06 |
| 2020/0191996 A1 | 6/2020 | Conn et al. | |
| 2020/0192467 A1 | 6/2020 | Capgolu et al. | |
| 2020/0241167 A1* | 7/2020 | Bratvedt | E21B 49/00 |
| 2020/0256178 A1 | 8/2020 | Wang et al. | |
| 2022/0011465 A1* | 1/2022 | Kibodeaux | G01N 23/2255 |

OTHER PUBLICATIONS

Sabbagh, Reza, Mohammad Amin Kazemi, Hirad Soltani, and David S. Nobes. 2020. "Micro- and Macro-Scale Measurement of Flow Velocity in Porous Media: A Shadow Imaging Approach for 2D and 3D" Optics 1, No. 1: 71-87. https://doi.org/10.3390/opt1010006 (Year: 2020).*

Hans-Balder Havenith, Philippe Cerfontaine & Anne-Sophie Mreyen (2017): How virtual reality can help visualise and assess geohazards, International Journal of Digital Earth (Year: 2017).*

Search Report and Written Opinion issued for International Patent Application No. PCT/US2022/071280, dated Jun. 30, 2022, ISA/KR, 9 pages.

International Search Report and Written Opinion for PCT/US2022-071280 dated Nov. 17, 2022.

* cited by examiner

VISUALIZING FLUID FLOW THROUGH POROUS MEDIA IN VIRTUAL REALITY

CROSS-REFERENCE TO RELATED APPLICATIONS

This application claims priority to U.S. Provisional Application No. 63/166,882, filed on Mar. 26, 2021, the benefit of which is claimed and the disclosure of which is incorporated herein by reference in its entirety.

FIELD OF THE DISCLOSURE

The present disclosure relates generally to reservoir modeling and simulation, and particularly, to visualization techniques for simulating fluid flow through reservoir rock formations.

BACKGROUND

In the oil and gas industry, knowing the properties and locations of underground reservoir rock formations is useful for making decisions as to where and how to economically produce hydrocarbons from the subsurface. For example, an asset team making development and production decisions may encounter various rock types in a reservoir formation, where each rock type may be defined by a set of petrophysical and hydraulic rock properties of the formation. Rock typing in petrophysics typically involves an analysis of Flow Zone Indicators (FZIs), which are a function of the pore space within a reservoir rock matrix. Although the pore properties (e.g., pore-size, pore-shape, and pore-type) of a reservoir formation are known to influence or control both single-phase and multi-phase fluid flow within the formation, conventional geological models rarely link a formation's rock types to its pore properties. The size and distribution of pore throats, for example, may significantly impact, i.e., constrict, fluid flow within the formation. Additionally, the formation may have poor fluid conduits due to local inclusions and other higher-scale geological features that can also constrict fluid flow. Therefore, understanding the locations of such fluid flow constrictions at all scales (e.g., from pore-scale to reservoir-scale) may be useful in making optimal decisions with regards to hydrocarbon development and production.

Formation visualization tools may be used to aid this understanding. Traditional visualization tools, however, fail to provide an effective way to visualize the locations and characteristics of pore throats and other sources of fluid flow constrictions within a formation at different scales of investigation. Any capability for user interaction provided by such visualization tools is also limited by the fact that the visualized formation data is represented on a two-dimensional computer monitor.

BRIEF DESCRIPTION OF THE DRAWINGS

The present disclosure is best understood from the following detailed description when read with the accompanying figures.

DETAILED DESCRIPTION

Embodiments of the present disclosure relate to providing an interactive three-dimensional (3D) visualization of flow fields within a virtual reality (VR) environment representing a reservoir formation sample. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 3:
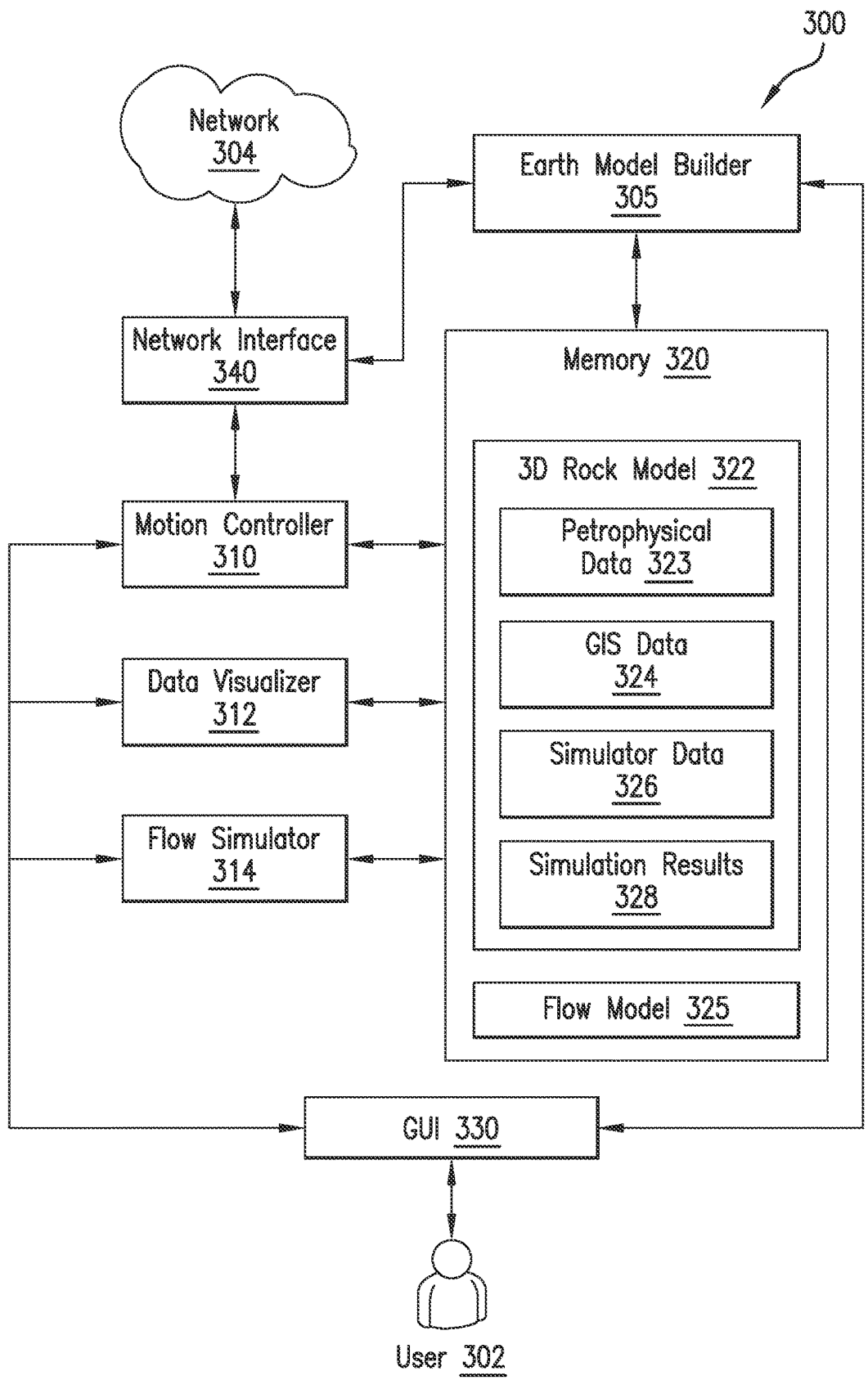
FIG. 3 is a block diagram of a visualization system for providing a visualization of flow lines within an interactive three-dimensional (3D) virtual environment representing a reservoir formation sample.

Embodiments of the present disclosure relate to visualizing fluid flows (also referred to herein as "flow fields" or "flow lines") within a reservoir formation sample, e.g., a sampled portion of a reservoir formation, as represented by a 3D VR environment. A fluid flow or flow field may be based on, for example, a vector field representing a distribution of flow velocity (and/or other flow properties) along one or more flow lines through the pore space of the reservoir formation sample. Such a vector field may be visualized within the 3D VR environment as a colored heat map that is scaled to a magnitude of the flow properties at different points along a flow field (or flow line). The heat map may be generated using a numeric simulation of fluid flow in the presence of a second fluid (relative permeability measurement). Simulation results may be used to determine a distribution of flow velocity (and other relevant flow parameters—e.g., direction of flow, velocity gradient, pressure gradient, fluid density, pore throat size, pore distribution, etc.) at different points along a flow line through a pore space within the formation's rock matrix. For example, each point may be associated with a set of data values representing flow parameters that characterize a particular type of flow within the pore space. Such parameters may be derived from any of various petrophysical data sources and provided as input to a data visualizer, which may be a part of a VR visualization tool, e.g., as shown in FIG. 3. In some embodiments, each flow line within the 3D environment may be generated by connecting different data points corresponding to a pore space of the formation sample and having relatively similar data values (and thus, similar flow properties). As will be described in further detail below, an interactive visualization of the 3D environment, including the flow lines, may be displayed at different scales and resolutions, ranging from a very large scale measured in meters or miles (e.g., covering an entire formation or relatively large portion thereof) to a very small scale measured in millimeters or microns (e.g., covering a pore structure of a size equivalent to a human hair follicle). It should be appreciated, however, that any unit of measurement may be used to display the reservoir formation sample at different scales within the 3D environment as desired for a particular implementation.

The flow field visualization in a 3D VR setting may be uniquely suited for visual analysis of pore throats in the reservoir formation sample and their relationship to the surrounding rock matrix and pore bodies within the sample. Visual analysis of the flow field presented in this setting may be an effective tool for defining Flow Zone Indicators (FZIs) and thereby identifying rock types in the formation sample. Virtual reality may provide an effective visualization tool for representing a geological model (or "digital twin") of the formation sample because it allows both the pore spaces and the rock matrix of the sample to be rendered together with the flow fields, which may be displayed as colored heat maps, as described above. The visual analysis of flow fields embedded in a 3D rock may be ideal for a cross-disciplinary investigation of the formation's hydrocarbon production potential because such flow fields may represent pore throats, which can be used to define production decline curves. The relationship between the pore bodies, the pore throats, and the rock matrix become apparent when flow fields of one or more fluid phases are visualized in concert with the surrounding rock formation. Because two disparate data streams (corresponding to the pore spaces and the rock matrix) are tied to one virtual rock, the complexities and challenges associated with rock typing and petrophysical analysis may be easier to comprehend and communicate amongst members of an asset team making development and production decisions. In this way, the VR visualization tools described herein may enable true collaboration by allowing multiple users (e.g., remote users communicating over the Internet) to view, share, and interpret formation data in the same three-dimensional workspace.

Illustrative embodiments and related methodologies of the present disclosure are described below in reference to FIGS. 1-8 as they might be employed, for example, in a computer system or device for planning and/or control of wellsite operations. For example, the disclosed techniques may be employed in such a computer system to visualize the results from simulating fluid flow within the reservoir rock formation. The simulation results then may be used, for example, to estimate the petroleum reserves of the formation for well placement, production planning, and/or stimulation planning purposes. In some cases, the properties of the formation may be determined based on digital images of a formation sample obtained from one or more imaging devices. In other cases, the distribution of hydraulic properties (e.g., porosity and permeability) of the formation sample may be evaluated from reservoir-scale formation imaging techniques performed while drilling. Examples of such techniques include, but are not limited to, seismic inversion and formation imaging. These techniques may be used to identify and assign rock types having known fluid flow characteristics to each digital image element. They also may be used to assign porosity and other rock characteristics affecting fluid flow to digital image elements directly from the image values. This information can then be used to generate a 3D geological model (or "digital twin") of the formation, as described above, which can then be visualized using a variety of traditional two-dimensional (2D) or 3D visualization techniques. Unlike conventional visualization techniques, which limit a user's ability to view and interact with multi-dimensional data relating to rock types and multi-phase flow fields to a 2D representation on a computer monitor, the VR visualization techniques disclosed herein enable true 3D data inspection and interpretation (e.g., for purposes of making development and production decisions) so that users will not only gain faster, more accurate data insight but also significantly reduce the overall data exploration costs.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
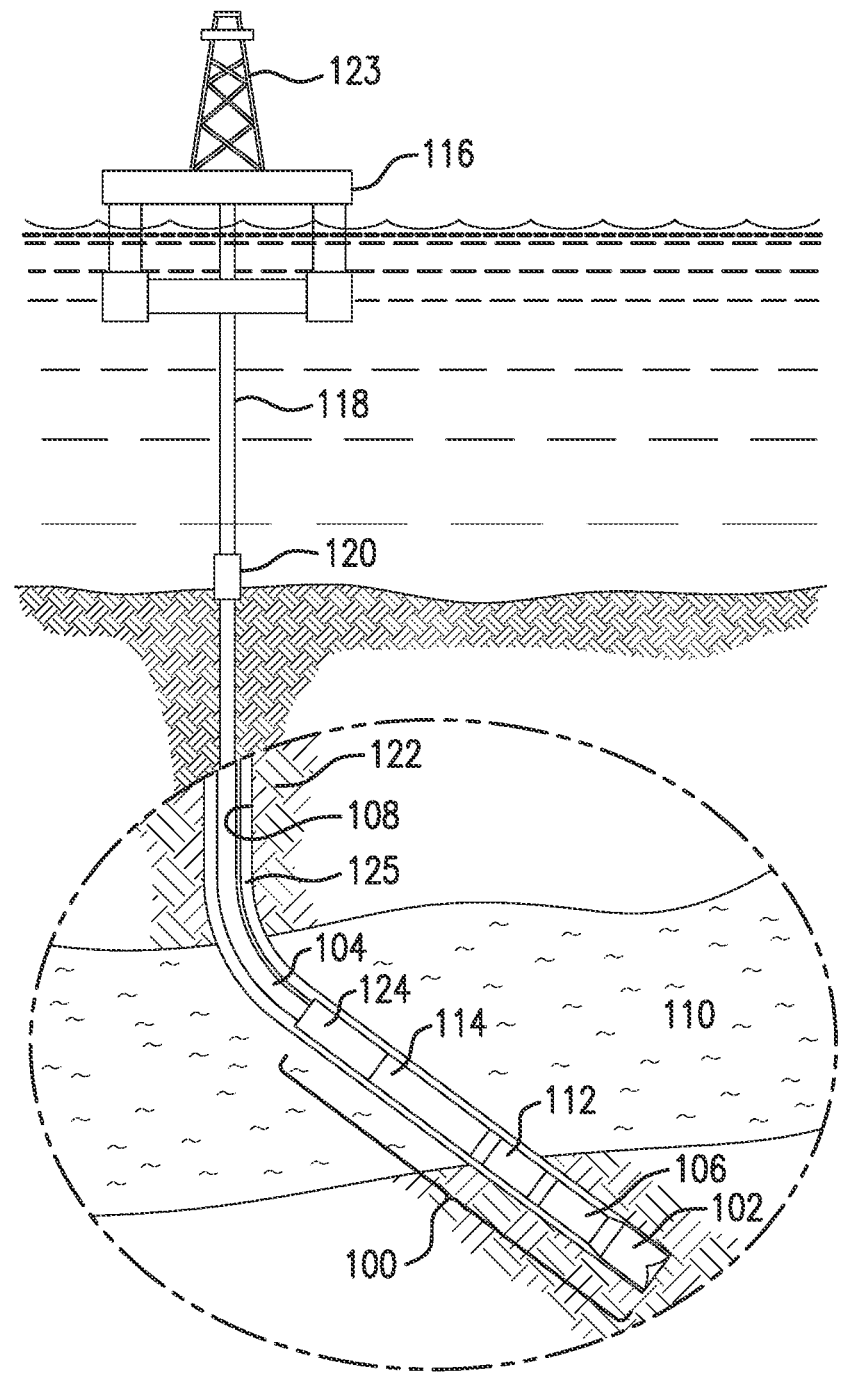
FIG. 1 is a diagram of an offshore drilling system in accordance with one or more embodiments of the present disclosure.

FIG. 1 is a diagram showing an example of an offshore drilling system for a subsea drilling operation. In particular, FIG. 1 shows a bottomhole assembly 100 for a subsea drilling operation, where the bottomhole assembly 100 illustratively comprises a drill bit 102 on the distal end of the drill string 104. Various logging-while-drilling (LWD) and measuring-while-drilling (MWD) tools may also be coupled within the bottomhole assembly 100. The distinction between LWD and MWD is sometimes blurred in the industry, but for purposes of this specification and claims LWD tools measure properties of the surrounding formation (e.g., resistivity, porosity, permeability), and MWD tools measure properties associated with the wellbore (e.g., inclination, and direction). In the example system, a logging tool 106 may be coupled just above the drill bit, where the logging tool may collect data associated with the wellbore 108 (e.g., MWD tool), or the logging tool 106 may collect data associated with the surrounding formation (e.g., a LWD tool). In some cases, the bottomhole assembly 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114. While not shown in FIG. 1, it should be appreciated that bottomhole assembly 100 may include additional measurement devices, for example, an imaging device for obtaining a digital volume image (or simply, "digital volume") representing a reservoir formation sample. The reservoir formation sample may correspond to, for example, a portion of the reservoir formation that may be of interest for hydrocarbon exploration and production. Alternatively, the digital volume image may be a 3D image of a core sample obtained from wellbore 108, e.g., by an extraction tool (not shown) coupled to bottomhole assembly 100, where the imaging device may be located at the surface of the wellsite or a remote processing facility, and the image may be received from a remote computing device communicatively coupled to a computer system associated with the wellsite via a network.

The bottomhole assembly 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to form the wellbore 108 through the formation material 122. The volume defined between the drill string 104 and the wellbore 108 is referred to as the annulus 125. The wellbore 108 penetrates subterranean zones or layers of a subsurface formation 110. One or more of these zones or layers may contain, for example, a reservoir of hydrocarbons in a commercially viable quantity.

The bottomhole assembly 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations thereof). Likewise, the telemetry module 124 may receive information from the surface over one or more of the communication channels.

Figure 2:
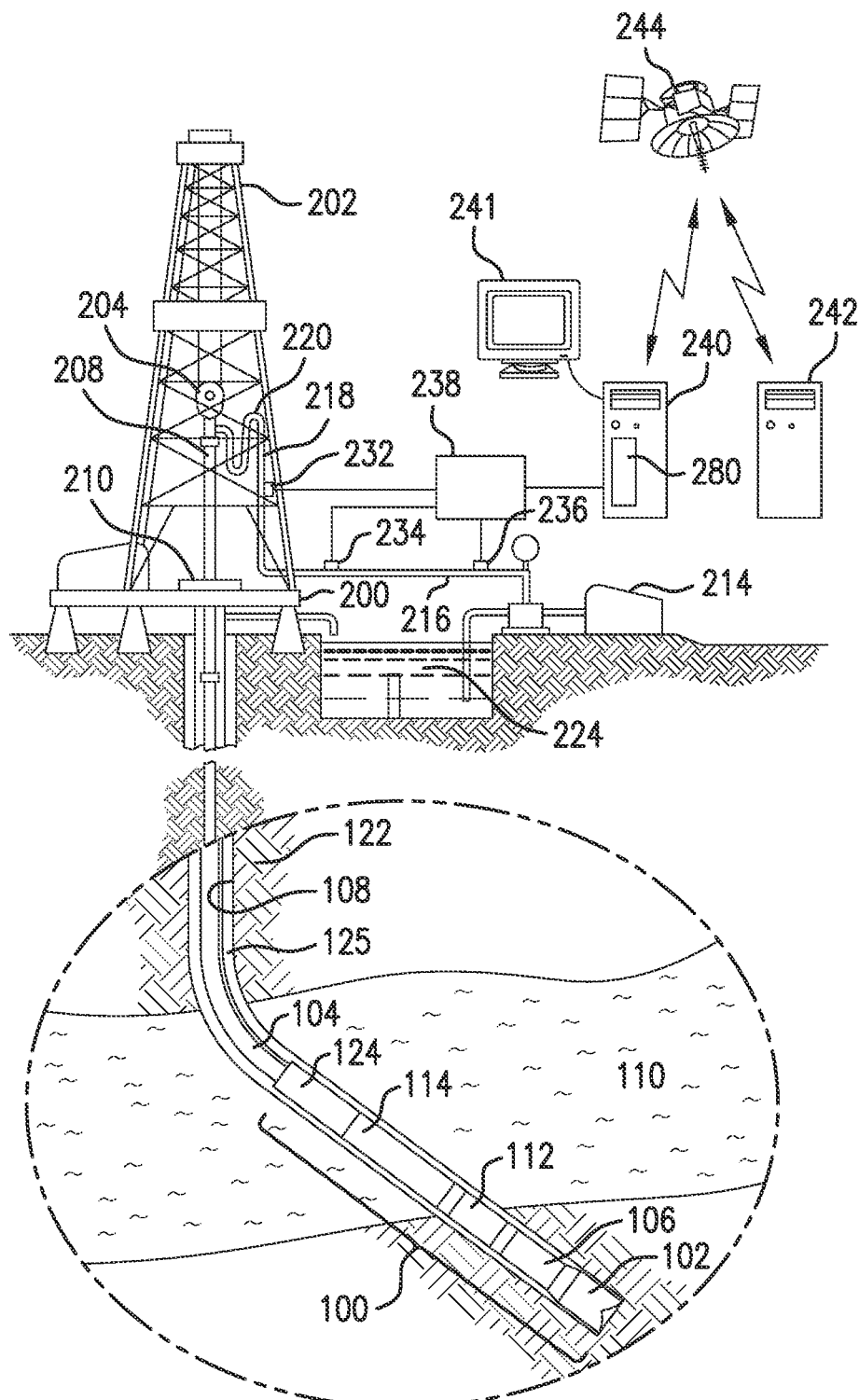
FIG. 2 is a diagram of an onshore drilling system in accordance with one or more embodiments of the present disclosure.

FIG. 2 is a diagram showing an example of an onshore drilling system for performing a land-based drilling operation. In particular, FIG. 2 shows a drilling platform 200 equipped with a derrick 202 that supports a hoist 204. The hoist 204 suspends a top drive 208, which rotates and lowers the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the wellbore 108 to the surface, and to balance the hydrostatic pressure in the rock formations.

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite. The surface computer system 240 operates in accordance with computer-executable instructions (which may be stored on a computer-readable storage medium) to monitor and control the drilling operation, as will be described in further detail below. Such instructions may be used, for example, to configure the surface computer system 240 to process and decode the downhole signals received from the telemetry mode 124 via digitizer 238.

In one or more embodiments, real-time data collected at the wellsite, including the downhole data from the telemetry module 124, may be displayed on a display device 241 coupled to the computer system 240. The representation of the wellsite data may be displayed using any of various display techniques. For example, the surface computer system 240 may generate a two-dimensional (2D) or three-dimensional (3D) graphical representation of the wellsite data for display on the display device 241. In some implementations, the graphical representation of the wellsite data may be displayed along with a representation of the planned well path to enable a user of the computer system 240 to visually monitor or track different stages of the drilling operation along the planned path of the wellbore 108 through formation 110. As will be described in further detail below, the graphical representation may be provided as part of an interactive visualization of a 3D virtual environment, e.g., via a VR display (not shown) coupled to computer system 240.

In one or more embodiments, the representations of the wellsite data, planned well path and predicted status of equipment, such as drill bit wear, may be displayed within a graphical user interface (GUI) of an application 280 executable at the surface computer system 240 for monitoring and controlling the drilling operation. Application 280 may provide, for example, a set of data analysis and visualization tools for well planning and control. Such tools may allow a user of the surface computer system 240 to monitor different stages of the drilling operation and adjust the drilling plan or planned path of the wellbore 108 as needed. For example, the GUI of the application 280 may include various control elements that the user can manipulate to manually adjust one or more controllable parameters for purposes of controlling the direction and/or orientation of drill bit 102 and path of the wellbore 108. In some implementations, the functions for monitoring and control of the drilling operation may be performed automatically, without any user intervention, by the application 280. In one or more embodiments, the surface computer system 240 and/or application 280 may communicate wellsite data to a VR visualization system, e.g., as shown in FIG. 3 and described in further detail below.

FIG. 3 is a block diagram of a visualization system 300 for providing an interactive 3D visualization of flow lines within a VR environment representing a reservoir formation or sample thereof. As shown in FIG. 3, system 300 includes an earth model builder 305, a motion controller (or motion control module) 310, a data visualizer 312, a flow simulator 314, a memory 320, a graphical user interface (GUI) 330, and a network interface 340. In one or more embodiments, earth model builder 305, motion controller 310, data visualizer 312, flow simulator 314, memory 320, GUI 330, and network interface 340 may be communicatively coupled to one another via an internal bus of system 300. While not shown in FIG. 3, it should be appreciated that GUI 330 of system 300 may be adapted to receive input from a user 302 via a user input device (e.g., a motion controller or specialized VR input device) and provide an interactive visualization of a 3D environment via a VR display (e.g., a VR headset), e.g., as shown in FIGS. 4, 5, and 6A-6D, which will be described in further detail below.

The components of system 300 shown in FIG. 3 may be implemented using a computing device having at least one processor and a processor-readable storage medium for storing data and instructions executable by the processor. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by each computing device to output or present information to a user via an output device (not shown). The output device may be, for example, a display coupled to or integrated with the computing device for displaying a digital representation of the information being presented to the user. Examples of such a computing device include, but are not limited to, a mobile phone, a personal digital assistant (PDA), a tablet computer, a laptop computer, a desktop computer, a workstation, a cluster of computers, a set-top box, or similar type of computing device. System 300 may use network interface 340 to communicate with other computing devices (not shown) via a network 304. Network 304 may include one or more networks, for example, a local area network ("LAN"), a medium-area network, or a wide area network ("WAN"), such as the Internet, or any combination thereof.

In some embodiments, visualization system 300 may be used to provide, for example, an extended reality viewer, which can serve as a communication tool for multi-disciplinary teams involved in hydrocarbon recovery operations associated with the reservoir formation. The visualization capabilities provided by system 300 may also help to improve the ability to integrate the geological model, the static model (petrophysical property upscaling), and the dynamic model (multi-phase flow properties) into a single, unified digital representation of the reservoir formation. An effective integration may optimize the completion and recovery of hydrocarbons. The functionality of such a viewer may improve assessment of where to find hydrocarbons, what reserves to book, and how to optimally complete and produce from a well drilled within the formation. As described above, flow fields embedded in a 3D rock may serve as an ideal medium for cross-disciplinary analysis and investigation of the formation's hydrocarbon production potential because such flow fields may represent pore throats, which can be used to define production decline curves. In some cases, it may not be possible to use pore scale flow simulators while drilling, as the required inputs, e.g., images of the rock sample, may not be available during drilling. However, as will be described in further detail below, it may be possible to generate an earth model, e.g., a 3D model of the reservoir formation, while drilling and use the generated model to run flow simulations that can in turn be used to determine the locations of flow lines at higher scales of the formation.

System 300 may provide functionality to view and interact with various data objects representing real-world physical objects in a 3D virtual or VR environment representing a subterranean reservoir rock formation sample. Such data objects may include, for example and without limitation: geographic information system (GIS) world maps; wellsite data (e.g., well surface locations and subsurface trajectories); 2D and 3D digital volume images; shape files; 2D grid surfaces (e.g., representing surfaces of an oil and gas basin); 2D plots (e.g., points, lines, and cross plots); and 3D flow fields (or flow lines). In one or more embodiments, the data objects may be stored in memory 320 as part of a 3D model of the subterranean rock formation sample (or "3D rock model") 322, as shown in FIG. 3. For example, the wellsite data along with the 2D and 3D digital volume images may be stored in memory 320 as petrophysical data 323. The GIS world maps may be stored as GIS data 324. The shape files and 2D grid surfaces may be stored as simulator data 326. The 2D plots and 3D flow fields may be stored as simulation results 328.

In one or more embodiments, 3D rock model 322 may be used to approximate the physical structure of the rock formation in 3D space. In some implementations, 3D rock model 322 may comprise a 3D mesh or grid of cells or tessellations that collectively represent a predetermined volume corresponding to the rock formation sample. The location of each cell within 3D rock model 322 may correspond to the physical location of an area within the rock formation sample represented by that cell. The cells may have equal or varying volumes and shapes, as desired for a particular implementation. Each cell of 3D rock model 322 may be stored within memory 320 in association with petrophysical data 323, GIS data 324, simulator data 326, and simulation results 328 for a corresponding area of the reservoir rock formation sample represented by that cell.

In one or more embodiments, 3D rock model 322 may be generated by earth model builder 305 based on a combination of petrophysical data 323, GIS data 324, simulator data 326, and simulation results 328. For example, earth model builder 305 may generate 3D rock model 322 as a 3D grid of cells and distribute petrophysical data 323, GIS data 324, simulator data 326, and any simulation results 328 (if available) to each cell in the grid as appropriate for the corresponding formation area represented by that cell. The petrophysical data 323 may include, for example, petrophysical properties of the reservoir formation sample that are derived from image properties of the 2D and 3D digital volume images obtained from one or more imaging devices, e.g., as described above. In one or more embodiments, such petrophysical properties may include hydraulic properties of the reservoir formation sample that can affect the flow of reservoir fluids. Examples of such hydraulic properties include, but are not limited to, porosity and permeability. The image properties associated with each volume element may represent the petrophysical and hydraulic properties of a portion of the reservoir formation sample corresponding to that volume element. Each volume element in this example may correspond to a particular cell of 3D rock model 322 and thus, represent a particular area of the formation sample that corresponds to the cell's relative location in 3D rock model 322. Likewise, each cell may be assigned GIS data 324 corresponding to the area of the formation sample represented by that cell and the cell's relative location in 3D rock model 322.

In one or more embodiments, earth model builder 305 may use petrophysical data 323 and GIS data 324 associated with 3D rock model 322 to generate a simulation deck or instructions for flow simulator 314 to perform a numerical simulation of reservoir fluid flow through the pore space of the reservoir formation sample. Flow simulator 314 may preprocess the petrophysical data 323 and GIS data 324 received as part of the simulation deck to derive simulator data 326. In some implementations, a separate data preprocessor (not shown) may be used for preprocessing the received data and storing the preprocessed data in memory 320 as simulator data 326 for the numerical flow simulation to be performed by flow simulator 314. In addition to shape files and 2D grid surfaces, simulator data 326 may include, for example, cell connectivity, transmissibility, pore volume arrays, and any other information that flow simulator 314 may need to perform the simulation.

The results of the numerical flow simulation performed by flow simulator 314 may be stored in memory 320 as simulation results 328 in association with each cell of 3D rock model 322, as described above. Simulation results 328 may include, for example, time-dependent fluid flow data representing a distribution of flow properties of the reservoir fluid. In one or more embodiments, system 300 may generate a flow model 325 based on simulation results 328. The generated flow model 325 may be, for example, in the form of a vector field representing the distribution of flow properties of the reservoir fluid at different points along one or more flow lines through the pore space of the reservoir formation sample.

In one or more embodiments, motion controller 310 and data visualizer 312 may use GUI 330 to provide an interactive visualization of 3D virtual environment representing the reservoir formation sample. The interactive visualization may include a graphical representation of the one or more flow lines within the 3D virtual environment. As will be described in further detail below with respect to FIGS. 4, 5, and 6A-6D, GUI 330 may be part of a VR display (e.g., a VR headset) for presenting the 3D virtual environment to user 302, which user 302 may control using a user input device (e.g., a motion controller or specialized VR input device).

Figure 4:
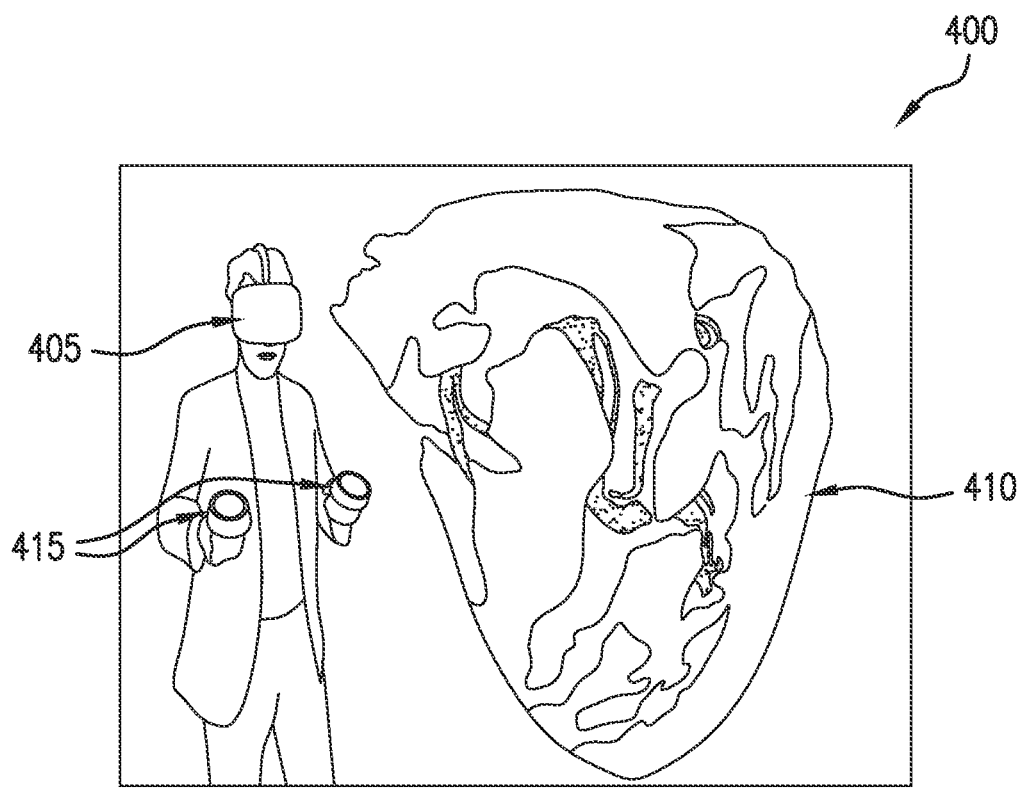
FIG. 4 shows an example of a user interacting with a visualization of a 3D environment using a VR headset and associated input devices.

FIG. 4 shows an example 400 of a user interacting with a visualization 410 of a 3D environment using a VR headset 405 and associated input devices 415. The 3D environment may be displayed to the user via VR headset 405. The input devices 415 may be any of various hardware controllers, e.g., dual left-hand and right-hand touchpad or joystick controllers, coupled to the VR headset 405 for controlling the visualization 410 of 3D environment as displayed via VR headset 405. The visualization may include graphical representations of various data objects that are rendered onto a geometry of 3D environment representing the reservoir formation sample described above. 3D environment may be displayed from the perspective of a virtual camera. The perspective may be defined by, for example, a view frustum in which objects may be displayed at varying levels of detail depending on their distance from the virtual camera. In one or more embodiments, the visualized data objects may include a graphical representation of one or more flow lines within 3D environment. The user in this example may change the position and other properties, e.g., altitude, pitch, yaw, and roll, of the virtual camera within the 3D environment by manipulating input devices 415. Referring back to system 300 of FIG. 3 described above, motion controller 310 may receive inputs from the user via input devices 415 and cause data visualizer 312 to update a current view of the 3D environment displayed within VR headset 405 accordingly. This may include, for example, causing an area of the 3D virtual environment, which includes the graphical representation of the one or more flow lines, to be rendered at varying levels of detail, as shown in FIGS. 5 and 6A-6D.

Figure 5:
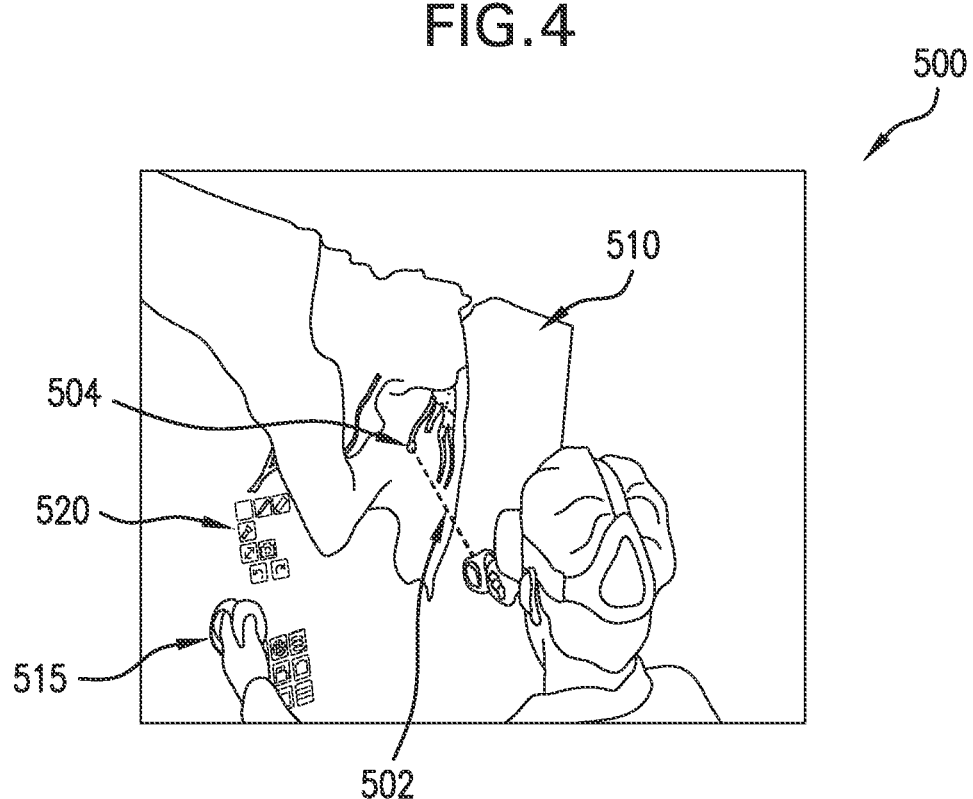
FIG. 5 shows an example of a visualization of a 3D environment with navigation and camera control tools for different types of user interaction.

FIG. 5 shows an example 500 of a visualization 510 of a 3D environment with navigation and camera control tools 520 for enabling different types of user interaction via an input device 515. Input device 515 may be, for example, a left-hand motion controller coupled to a VR headset along with a right-hand motion controller similar to that shown in FIG. 4. The user in this example may use input device 515 to select any of various software buttons corresponding to the navigation and camera control tools 520. As shown in FIG. 5, the user may, for example, select a target point 504 at some distance (as represented by a line 502) away from a current position of the virtual camera within the 3D environment. As shown in FIGS. 6A-6D, an area of the 3D environment corresponding to the target point 504 may be rendered at a selected level of detail within a current view of the interactive visualization and the current view as displayed within the VR headset may be updated accordingly.

Figure 6A:
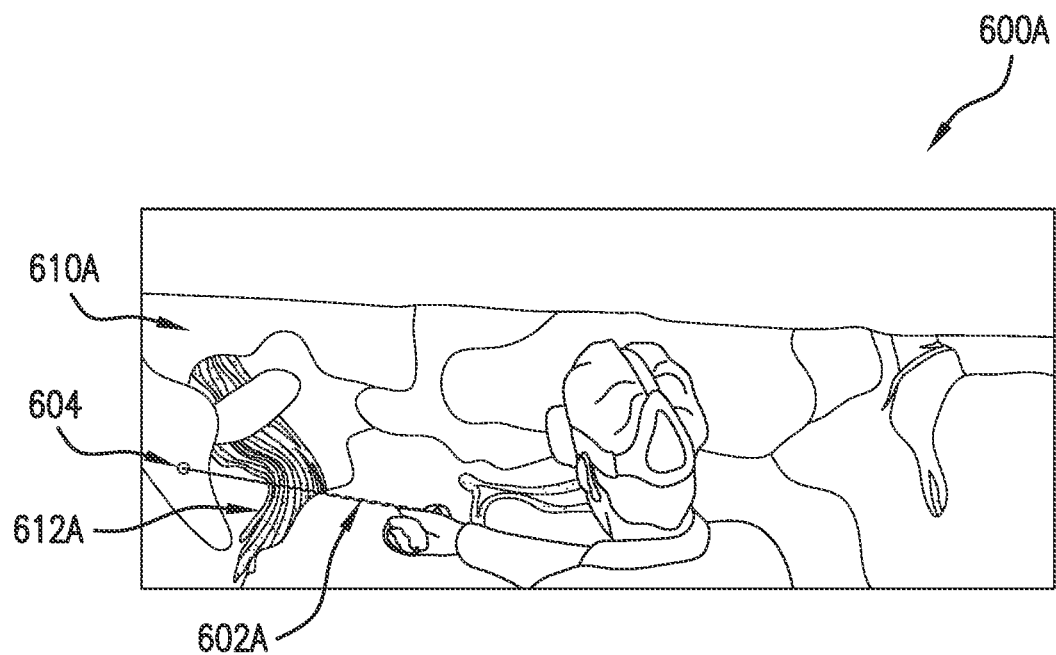
FIGS. 6A-6D illustrate different views of the 3D environment in FIG. 5 at different levels of detail as selected by a user via navigation controls accessible via a user input device.
Figure 6B:
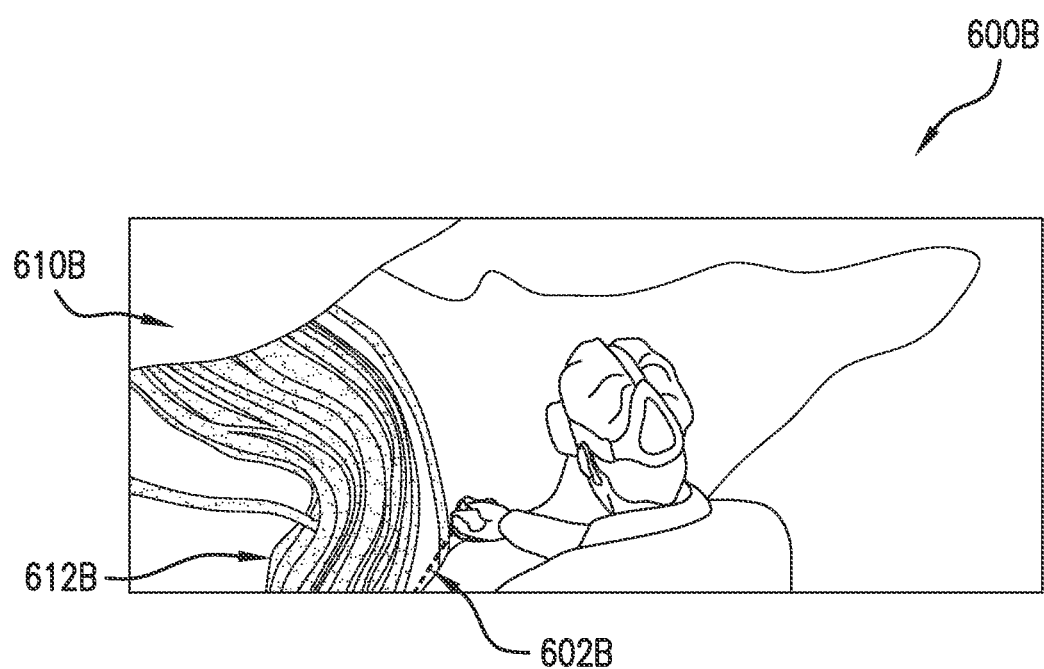
Figure 6C:
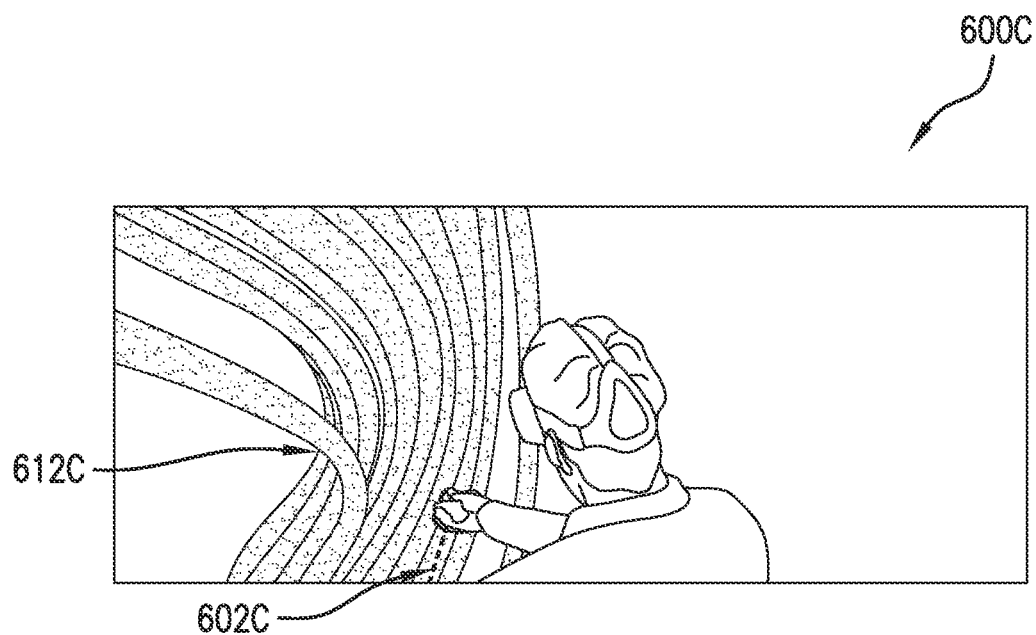
Figure 6D:
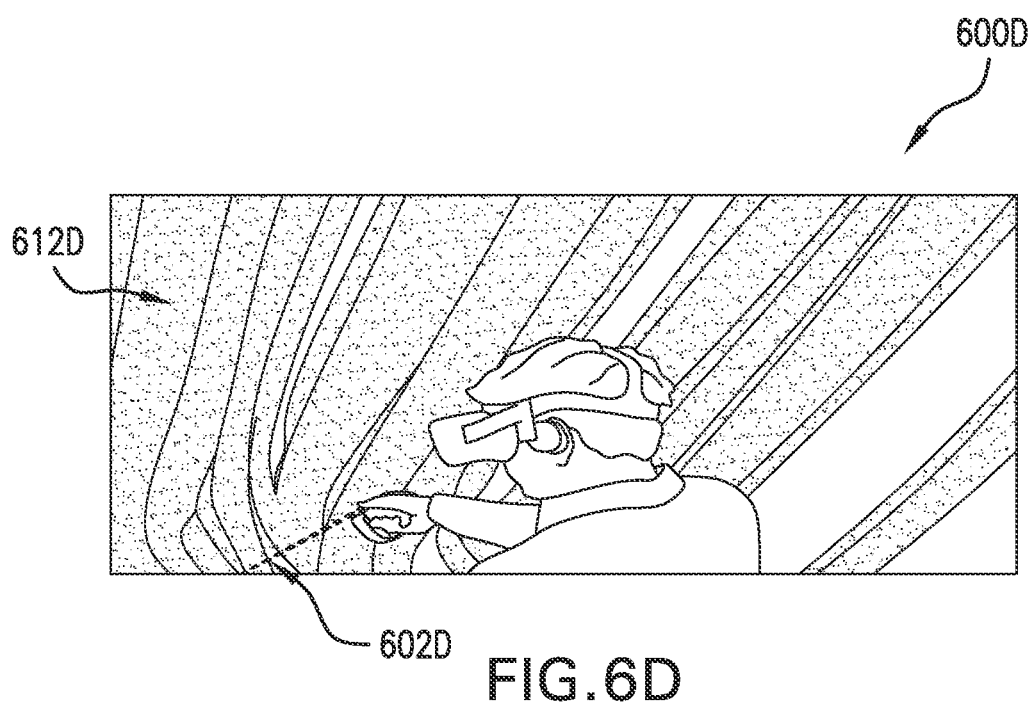

For example, FIGS. 6A-6D illustrate different views of the 3D environment in FIG. 5 at different levels of detail as selected by a user via navigation controls accessible via a user input device (e.g., a motion controller coupled to a VR headset). FIG. 6A shows a view 600A in which a visualization 610A of the 3D environment, which represents a reservoir formation sample, includes a set of flow lines 612A rendered as a heat map connecting corresponding points of the pore space of the reservoir formation sample. The user in FIG. 6A may select a target point 604 for increasing the level of detail (and level of zoom) by a distance 602A from the virtual camera's current position within the 3D environment. FIG. 6B shows a view 600B of a visualization 610B that includes a graphical representation of flow lines 612B at a relatively higher level of zoom or detail that corresponds to the target point 604 shown in FIG. 6A. The user may then select an even higher level of detail or zoom by selecting another target point at a distance 602B away from the virtual camera's current position, resulting in a view 600C of a visualization 612C, as shown in FIG. 6C. The user may further increase the level of zoom for displaying the visualization at incrementally higher levels of details, for example, by selecting additional target points at distances 602C and 602D, as shown in FIGS. 6C and 6D for views 600C and 600D of visualizations 612C and 612D, respectively. While embodiments are described using FIGS. 5 and 6A-6D, it should be appreciated that the visualization techniques described herein are not limited thereto and that these techniques may be used to provide an interactive visualization of a 3D virtual environment representing the reservoir formation sample and flow lines therein at any level of detail as desired for a particular implementation.

Figure 7:
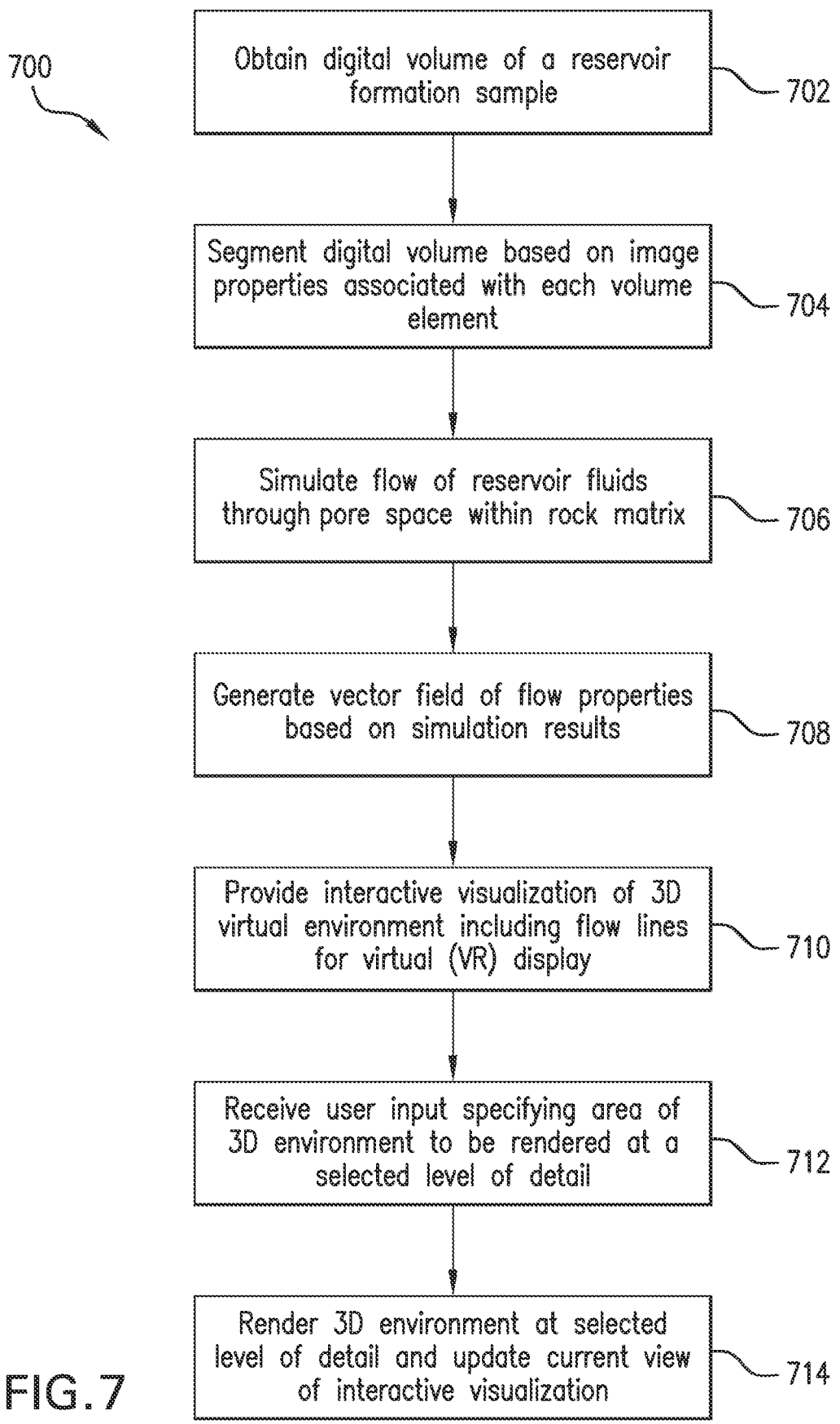
FIG. 7 is a flowchart of a process for providing a visualization of flow lines within an interactive three-dimensional (3D) virtual environment representing a reservoir formation sample.

FIG. 7 is a flowchart of a process 700 for providing an interactive 3D visualization of flow lines within a VR environment representing a reservoir formation sample. For example, process 700 may be implemented using the visualization system 300 of FIG. 3 as described above. However, process 700 is not intended to be limited thereto.

As shown in the example of FIG. 7, process 700 begins in block 702, which includes obtaining a digital volume image (or simply, "digital volume") representing a reservoir formation sample. The digital volume may include a plurality of volume elements corresponding to different points in a 3D model of the reservoir formation sample. The 3D model may be, for example, a geological model of the formation (or relevant portion thereof). In some embodiments, the geological model may combine static and dynamic models of the formation that represent the formation's petrophysical properties and multi-phase flow conductance properties, respectively. The digital volume in this example may be obtained from an imaging device, e.g., a downhole imaging device coupled to the bottomhole assembly of a drill string (e.g., bottomhole assembly 100 of drill string 104 shown in FIG. 1, as described above) disposed within a wellbore drilled into the formation. Examples of such an imaging device include, but are not limited to, an x-ray imaging device, a computed tomography (CT) scanner, a focused ion beam (FIB) scanner, and a scanning electron microscope (SEM). In some embodiments, the digital volume may be a 3D image of the reservoir formation sample, and each volume element may be a voxel corresponding to a location within the 3D image.

In block 704, the digital volume is segmented by assigning hydraulic properties of a corresponding portion of the reservoir formation sample to each volume element based on image properties associated with that volume element. The image properties associated with each volume element may represent, for example, petrophysical properties of a corresponding portion of the reservoir formation sample. In some embodiments, the segmentation in block 704 may be performed by classifying each volume element as corresponding to a point in the geological model representing at least one of a pore space or a rock matrix surrounding the pore space within the reservoir formation sample, based on the petrophysical properties associated with that volume element. In case of higher scale fluid flow simulation, each volume element may be characterized as having certain fluid conductance properties, based on the petrophysical properties represented by the image properties associated with the element. This characterization may be based on identifying the image properties of the element as representing petrophysical properties of a particular rock type with known fluid conductance properties.

In block 706, a flow of reservoir fluids is simulated through different points of the geological model representing the pore space within the rock matrix of the reservoir formation sample, based on the segmented digital volume. Additionally or alternatively, the simulation may provide a more general distribution of fluid flow properties through the digital volume. In some embodiments, the flow of reservoir fluids may be simulated using computational fluid dynamics (CFD) and the geological model, e.g., a 3D model of the reservoir formation sample generated based on the digital volume image obtained in block 702.

Block 708 includes generating a vector field representing a distribution of flow properties of the reservoir fluids at different points along one or more flow lines through the pore space, based on the simulation (or simulation results) from block 706. The flow properties of the reservoir fluids may include, for example and without limitation, at least one of a flow velocity or a hydraulic pressure.

In block 710, an interactive visualization of a 3D virtual environment representing the reservoir formation sample is provided via a VR display. The interactive visualization may include a graphical representation of the one or more flow lines within the 3D virtual environment. In some implementations, the graphical representation for each of the one or more flow lines may be rendered within the interactive visualization as a heat map connecting corresponding points of the pore space of the reservoir formation sample as represented within the 3D virtual environment. The visual properties of the heat map may be varied according to the flow properties associated with each point along a corresponding flow line. For example, the flow properties of the reservoir fluid may include a flow velocity at each point along a corresponding flow line within the pore space, and the visual properties of the heat map for each flow line may be varied according to at least one of a direction or a magnitude of the flow velocity associated with each corresponding point.

In block 712, user input specifying an area of the 3D virtual environment to be viewed or rendered at a selected level of detail within a current view of the interactive visualization is received. The current view of the interactive visualization may be rendered, for example, from the perspective of a virtual camera, which the user can manipulate via different controls (e.g., camera and/or navigation controls) accessible via a user input device (e.g., a motion controller) coupled to the VR display.

In block 714, the specified area of the 3D virtual environment is rendered within the VR display at the selected level of detail and the current view of the interactive visualization (and perspective of the virtual camera) is updated accordingly.

Figure 8:
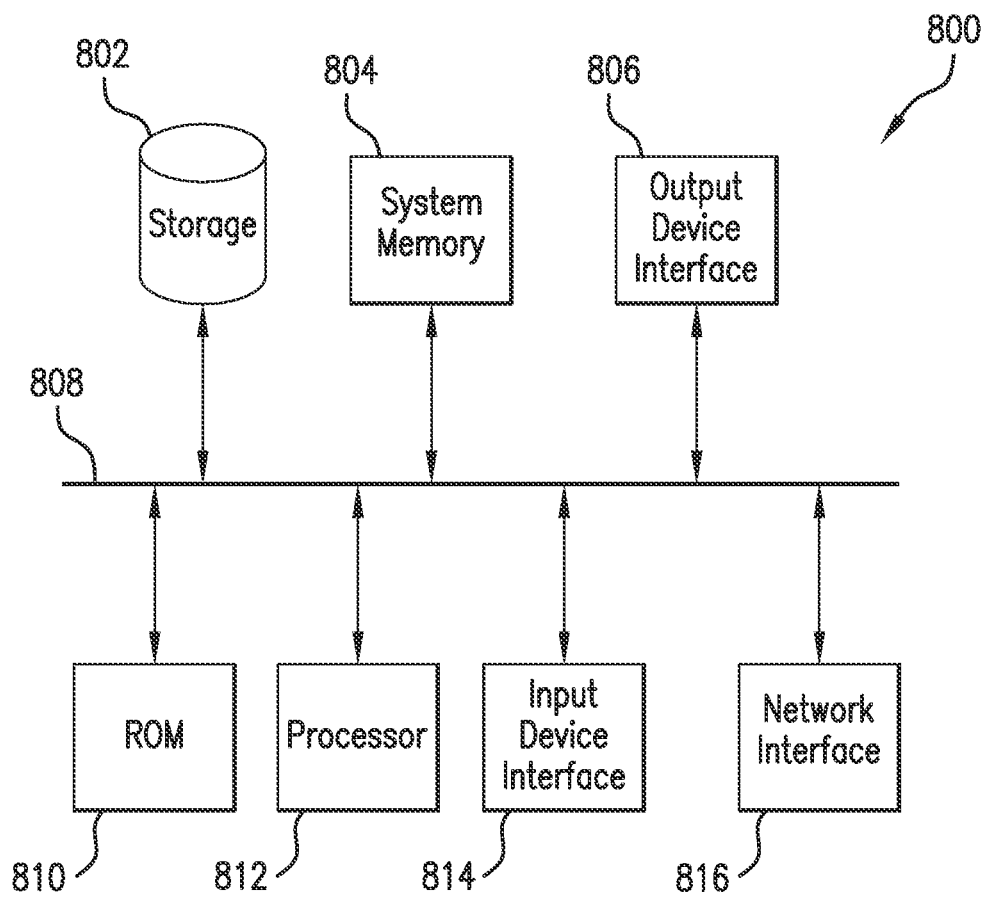
FIG. 8 is a block diagram illustrating an example of a computer system in which embodiments of the present disclosure may be implemented.

FIG. 8 is a block diagram illustrating an example of a computer system 800 in which embodiments of the present disclosure may be implemented. For example, visualization system 300 of FIG. 3 and process 700 of FIG. 7, as described above, may be implemented using system 800. System 800 can be a computer, phone, PDA, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a flash drive or hard drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for performing the disclosed VR visualization techniques in accordance with some implementations. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

As shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 700 of FIG. 7, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

For example, a computer-implemented method of visualizing subterranean fluid flows in a virtual environment has been described. Embodiments of the method may include: obtaining, by a computing device from an imaging device communicatively coupled to the computing device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample; segmenting, by the computing device, the digital volume image by assigning hydraulic properties of the reservoir formation sample to each volume element in the plurality of volume elements, based on the image properties associated with that volume element; simulating a flow of reservoir fluids through the pore space within the rock matrix of the reservoir formation sample, based on the segmented digital volume image; generating a vector field representing a distribution of flow properties of the reservoir fluids along one or more flow lines through the pore space, based on the simulation; providing, via a virtual reality (VR) display coupled to the computing device, an interactive visualization of a three-dimensional (3D) virtual environment representing the reservoir formation sample, the interactive visualization including a graphical representation of the one or more flow lines within the 3D virtual environment; receiving, via a user input device coupled to the computing device, user input specifying an area of the 3D virtual environment to be rendered at a selected level of detail within a current view of the interactive visualization; rendering, by the computing device via the VR display, the specified area of the 3D virtual environment at the selected level of detail; and updating, by the computing device, the current view of the interactive visualization of the 3D virtual environment as rendered within the VR display.

Likewise, a computer-readable storage medium has been described. Embodiments of the computer-readable storage medium may have instructions stored therein have been described, where the instructions, when executed by a computer, cause the computer to perform a plurality of functions, including functions to: obtain, from an imaging device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample; segment the digital volume image by assigning hydraulic properties of the reservoir formation sample to each volume element in the plurality of volume elements, based on the image properties associated with that volume element; simulate a flow of reservoir fluids through the pore space within the rock matrix of the reservoir formation sample, based on the segmented digital volume image; generate a vector field representing a distribution of flow properties of the reservoir fluids along one or more flow lines through the pore space, based on the simulation; provide, via a virtual reality (VR) display, an interactive visualization of a three-dimensional (3D) virtual environment representing the reservoir formation sample, the interactive visualization including a graphical representation of the one or more flow lines within the 3D virtual environment; receive, via a user input device, user input specifying an area of the 3D virtual environment to be rendered at a selected level of detail within a current view of the interactive visualization; render, via the VR display, the specified area of the 3D virtual environment at the selected level of detail; and update the current view of the interactive visualization of the 3D virtual environment as rendered within the VR display.

The foregoing embodiments of the method or computer-readable storage medium may include any one or any combination of the following elements, features, functions, or operations: the flow of reservoir fluids is simulated using computational fluid dynamics (CFD) and a 3D model of the reservoir formation sample generated based on the digital volume image; the digital volume image is a 3D image of the reservoir formation sample, and each volume element is a voxel within the 3D image; the image properties associated with each volume element represent petrophysical properties associated with that volume element, and segmenting the digital volume image includes classifying each volume element of the digital volume image as corresponding to at least one of the pore space or the rock matrix of the reservoir formation sample, based on petrophysical properties represented by the image properties associated with that volume element, and assigning the fluid flow hydraulic properties to each volume element based on the classification; the imaging device is selected from the group consisting of: an x-ray imaging device; a computed tomography (CT) scanner; a focused ion beam (FIB) scanner; and a scanning electron microscope (SEM); the digital volume image representing the reservoir formation sample is obtained from the imaging device at a reservoir scale; the reservoir formation sample corresponds to a portion of a reservoir formation, the imaging device is a downhole imaging device coupled to a bottomhole assembly of a drill string disposed in a wellbore being drilled within the reservoir formation, and the digital volume image is based on image data collected by the downhole imaging device as the wellbore is drilled within the reservoir formation; the flow properties of the reservoir fluid include at least one of a flow velocity or a hydraulic pressure; the graphical representation for each of the one or more flow lines is rendered within the interactive visualization of the 3D virtual environment as a heat map connecting corresponding points of the pore space, and visual properties of the heat map are varied according to the flow properties associated with each point along a corresponding flow line; and the flow properties of the reservoir fluid include a flow velocity at each point along a corresponding flow line within the pore space, and the visual properties of the heat map for each flow line are varied according to at least one of a direction or a magnitude of the flow velocity associated with each corresponding point.

Furthermore, a system for has been described. Embodiments of the system may include a processor and a memory coupled to the processor, where the memory may have processor-executable instructions stored therein, which, when executed by the processor, cause the processor to perform a plurality of functions, including functions to: obtain, from an imaging device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample; segment the digital volume image by assigning hydraulic properties of the reservoir formation sample to each volume element in the plurality of volume elements, based on the image properties associated with that volume element; simulate a flow of reservoir fluids through the pore space within the rock matrix of the reservoir formation sample, based on the segmented digital volume image; generate a vector field representing a distribution of flow properties of the reservoir fluids along one or more flow lines through the pore space, based on the simulation; provide, via a virtual reality (VR) display, an interactive visualization of a three-dimensional (3D) virtual environment representing the reservoir formation sample, the interactive visualization including a graphical representation of the one or more flow lines within the 3D virtual environment; receive, via a user input device, user input specifying an area of the 3D virtual environment to be rendered at a selected level of detail within a current view of the interactive visualization; render, via the VR display, the specified area of the 3D virtual environment at the selected level of detail; and update the current view of the interactive visualization of the 3D virtual environment as rendered within the VR display.

The foregoing embodiments of the system may include any one or any combination of the following elements, features, functions, or operations: the flow of reservoir fluids is simulated using computational fluid dynamics (CFD) and a 3D model of the reservoir formation sample generated based on the digital volume image; the digital volume image is a 3D image of the reservoir formation sample, and each volume element is a voxel within the 3D image; the image properties associated with each volume element represent petrophysical properties associated with that volume element, and segmenting the digital volume image includes classifying each volume element of the digital volume image as corresponding to at least one of the pore space or the rock matrix of the reservoir formation sample, based on petrophysical properties represented by the image properties associated with that volume element, and assigning the fluid flow hydraulic properties to each volume element based on the classification; the imaging device is selected from the group consisting of: an x-ray imaging device; a computed tomography (CT) scanner; a focused ion beam (FIB) scanner; and a scanning electron microscope (SEM); the digital volume image representing the reservoir formation sample is obtained from the imaging device at a reservoir scale; the reservoir formation sample corresponds to a portion of a reservoir formation, the imaging device is a downhole imaging device coupled to a bottomhole assembly of a drill string disposed in a wellbore being drilled within the reservoir formation, and the digital volume image is based on image data collected by the downhole imaging device as the wellbore is drilled within the reservoir formation; the flow properties of the reservoir fluid include at least one of a flow velocity or a hydraulic pressure; the graphical representation for each of the one or more flow lines is rendered within the interactive visualization of the 3D virtual environment as a heat map connecting corresponding points of the pore space, and visual properties of the heat map are varied according to the flow properties associated with each point along a corresponding flow line; and the flow properties of the reservoir fluid include a flow velocity at each point along a corresponding flow line within the pore space, and the visual properties of the heat map for each flow line are varied according to at least one of a direction or a magnitude of the flow velocity associated with each corresponding point.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of visualizing subterranean fluid flows in a virtual environment, the method comprising:

obtaining, by a computing device from an imaging device communicatively coupled to the computing device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample;

segmenting, by the computing device, the digital volume image by assigning hydraulic properties of the reservoir formation sample to each volume element in the plurality of volume elements, based on the image properties associated with that volume element;

simulating a flow of reservoir fluids through the pore space within the rock matrix of the reservoir formation sample, based on the segmented digital volume image;

generating a vector field representing a distribution of flow properties of the reservoir fluids along one or more flow lines through the pore space, based on the simulation;

providing, via a virtual reality (VR) display coupled to the computing device, an interactive visualization of a three-dimensional (3D) virtual environment comprising one or more flow lines as a heat map, wherein the heat map connects corresponding points of the pore space of the reservoir formation sample;

receiving, via a user input device coupled to the computing device, user input specifying an area of the 3D virtual environment to be rendered at a selected level of detail within a current view of the interactive visualization;

rendering, by the computing device via the VR display, the specified area of the 3D virtual environment at the selected level of detail; and updating, by the computing device, the current view of the interactive visualization of the 3D virtual environment as rendered within the VR display.

2. The method of claim 1, wherein the flow of reservoir fluids is simulated using computational fluid dynamics (CFD) and a 3D model of the reservoir formation sample generated based on the digital volume image.

3. The method of claim 1, wherein the digital volume image is a 3D image of the reservoir formation sample, and each volume element is a voxel within the 3D image.

4. The method of claim 1, wherein the image properties associated with each volume element represent petrophysical properties of a corresponding portion of the reservoir formation sample, and segmenting the digital volume image comprises:

classifying each volume element of the digital volume image as corresponding to at least one of the pore space or the rock matrix of the reservoir formation sample, based on the petrophysical properties represented by the image properties associated with that volume element; and assigning the hydraulic properties to each volume element based on the classification.

5. The method of claim 1, wherein the imaging device is selected from the group consisting of: an x-ray imaging device; a computed tomography (CT) scanner; a focused ion beam (FIB) scanner; and a scanning electron microscope (SEM).

6. The method of claim 1, wherein the digital volume image representing the reservoir formation sample is obtained from the imaging device at a reservoir scale.

7. The method of claim 1, wherein the reservoir formation sample corresponds to a portion of a reservoir formation, the imaging device is a downhole imaging device coupled to a bottomhole assembly of a drill string disposed in a wellbore being drilled within the reservoir formation, and the digital volume image is based on image data collected by the downhole imaging device as the wellbore is drilled within the reservoir formation.

8. The method of claim 1, wherein the flow properties of the reservoir fluid include at least one of a flow velocity or a hydraulic pressure.

9. The method of claim 1, wherein the graphical representation for each of the one or more flow lines is rendered within the interactive visualization of the 3D virtual environment as a heat map connecting corresponding points of the pore space, and visual properties of the heat map are varied according to the flow properties associated with each point along a corresponding flow line.

10. The method of claim 1, wherein the flow properties of the reservoir fluid include a flow velocity at each point along a corresponding flow line within the pore space, and the visual properties of the heat map for each flow line are varied according to at least one of a direction or a magnitude of the flow velocity associated with each corresponding point.

11. A system comprising:

a processor;

a memory coupled to the processor, the memory having processor-executable instructions stored therein, which, when executed by the processor, cause the processor to perform a plurality of functions, including functions to:

obtain, from an imaging device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample;

segment the digital volume image by assigning hydraulic properties of the reservoir formation sample to each volume element in the plurality of volume elements, based on the image properties associated with that volume element;

simulate a flow of reservoir fluids through the pore space within the rock matrix of the reservoir formation sample, based on the segmented digital volume image;

generate a vector field representing a distribution of flow properties of the reservoir fluids along one or more flow lines through the pore space, based on the simulation;

provide, via a virtual reality (VR) display, an interactive visualization of a three-dimensional (3D) virtual environment comprising one or more flow lines as a heat map, wherein the heat map connects corresponding points of the pore space of the reservoir formation sample;

receive, via a user input device, user input specifying an area of the 3D virtual environment to be rendered at a selected level of detail within a current view of the interactive visualization;

render, via the VR display, the specified area of the 3D virtual environment at the selected level of detail; and update the current view of the interactive visualization of the 3D virtual environment as rendered within the VR display.

12. The system of claim 11, wherein the flow of reservoir fluids is simulated using computational fluid dynamics (CFD) and a 3D model of the reservoir formation sample generated based on the digital volume image.

13. The system of claim 11, wherein the digital volume image is a 3D image of the reservoir formation sample, and each volume element is a voxel within the 3D image.

14. The system of claim 11, wherein the image properties associated with each volume element represent petrophysical properties associated with that volume element, and the functions performed by the processor further include functions to:

classify each volume element of the digital volume image as corresponding to at least one of the pore space or the rock matrix of the reservoir formation sample, based on the petrophysical properties represented by the image properties associated with that volume element; and assign the hydraulic properties to each volume element based on the classification.

15. The system of claim 11, wherein the imaging device is selected from the group consisting of: an x-ray imaging device; a computed tomography (CT) scanner; a focused ion beam (FIB) scanner; and a scanning electron microscope (SEM).

16. The system of claim 11, wherein the digital volume image representing the reservoir formation sample is obtained from the imaging device at a reservoir scale.

17. The system of claim 11, wherein the reservoir formation sample corresponds to a portion of a reservoir formation, the imaging device is a downhole imaging device coupled to a bottomhole assembly of a drill string disposed in a wellbore being drilled within the reservoir formation, and the digital volume image is based on image data collected by the downhole imaging device as the wellbore is drilled within the reservoir formation.

18. The system of claim 11, wherein the graphical representation for each of the one or more flow lines is rendered within the interactive visualization of the 3D virtual environment as a heat map connecting corresponding points of the pore space, and visual properties of the heat map are varied according to the flow properties associated with each point along a corresponding flow line.

19. The system of claim 11, wherein the flow properties of the reservoir fluid include at least one of a flow velocity or a hydraulic pressure at each point along a corresponding flow line within the pore space, and the visual properties of the heat map for each flow line are varied according to a magnitude of the flow properties associated with each corresponding point.

20. A computer-readable storage medium having instructions stored therein, which when executed by a computer cause the computer to perform a plurality of functions, including functions to:

obtain, from an imaging device, a digital volume image representing a reservoir formation sample, the digital volume image including a plurality of volume elements corresponding to different points within the reservoir formation sample, each volume element having image properties representing at least one of a pore space or a rock matrix at a corresponding point within the reservoir formation sample;

segment the digital volume image by assigning hydraulic properties of the reservoir formation sample to each volume element in the plurality of volume elements, based on the image properties associated with that volume element;

simulate a flow of reservoir fluids through the pore space within the rock matrix of the reservoir formation sample, based on the segmented digital volume image;

generate a vector field representing a distribution of flow properties of the reservoir fluids along one or more flow lines through the pore space, based on the simulation;

provide, via a virtual reality (VR) display, an interactive visualization of a three-dimensional (3D) virtual environment comprising one or more flow lines as a heat map, wherein the heat map connects corresponding points of the pore space of the reservoir formation sample;

receive, via a user input device, user input specifying an area of the 3D virtual environment to be rendered at a selected level of detail within a current view of the interactive visualization;

render, via the VR display, the specified area of the 3D virtual environment at the selected level of detail; and update the current view of the interactive visualization of the 3D virtual environment as rendered within the VR display.

* * * * *